(12) United States Patent
Ray

(10) Patent No.: US 6,169,858 B1
(45) Date of Patent: Jan. 2, 2001

(54) PANORAMIC IMAGE CAPTURE AID

(75) Inventor: Lawrence A. Ray, Rochester, NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/360,681

(22) Filed: Jul. 26, 1999

(51) Int. Cl.[7] .......................... G03B 41/00; G03B 17/48; G03B 17/18
(52) U.S. Cl. ...................... 396/322; 396/429; 396/281; 396/661
(58) Field of Search .................................. 396/20, 21, 22, 396/23, 24, 281, 411, 429, 661, 6, 322, 335; 348/36, 37, 38, 39

(56) References Cited

U.S. PATENT DOCUMENTS

| | | | |
|---|---|---|---|
| 3,240,140 | * 3/1966 | Hearon et al. | 396/24 |
| 3,620,148 | * 11/1971 | Rocco et al. | 396/24 |
| 5,259,584 | * 11/1993 | Wainwright | 396/20 |
| 5,396,583 | 3/1995 | Chen et al. | 395/137 |
| 5,950,018 | * 9/1999 | Keller | 396/20 |

OTHER PUBLICATIONS

"Super 220 VR"—QuickTime VR from Apple Computer no date.
"Interactive Imaging System" from Eastern Kodak Company, http://www.kodak.com/global/en/professional/hub/interactiveI.../interactiveImaging Index.shtm no date.
"Applied Photographic Optics: Lenses and optical systems for photography, film video and electronic imaging", by Sidney F. Ray, 2$^{nd}$ edition, The Bath Proess, Avon, England, 1994, p. 42, and 460–462. no date.
"Roundshot 35/35S" by Seitz, http://www.roundshot/ch/produkte/35e.html no date.

* cited by examiner

Primary Examiner—Eddie C. Lee
(74) Attorney, Agent, or Firm—David M. Woods

(57) ABSTRACT

A panoramic image capture aid is formed in a photographic camera to assist a photographer in recording a series of film images that can be combined to form a panoramic image. The capture aid includes a viewing window on the camera, a first stripe indicator coupled to a film advance mechanism for moving with each film advance, and a second stripe indicator coupled to a compass for indicating the direction the camera is pointing. The first and second stripe indicators are supported on transparent rings concentrically arranged relative to the camera body such that their stripes intersect in the viewing window when the camera is properly positioned for the next image in the series of images.

11 Claims, 5 Drawing Sheets

PANORAMIC IMAGE CAPTURE AID

FIELD OF THE INVENTION

The invention relates generally to the field of photographic image capture, and in particular to the capture of panoramic images.

BACKGROUND OF THE INVENTION

Full 360 degree panoramic images are a means of producing visual content for a wide variety of applications, including virtual reality. There are a large number of methods to produce such images and the capability has been available for many years. The images have typically been acquired by expensive and specialized camera systems like the RoundShot 35 or 35S by Seitz. With the widespread use and availability of digital imaging techniques, the requirement for specialized cameras has been reduced and panoramic images can be composed from a collection of standard images. Instead of a camera which captures a panoramic image directly as a single image, a collection of standard images are captured and recorded and they are later digitally combined into a panoramic image. The distinguishing feature of the collection of standard images is that each image is one of a series of images each recorded with the camera pointing in a different horizontal direction.

The collection of images does have some constraints, such as the successive images need to have overlapping fields of view and should be parallel to the ground plane. Another, but less critical feature is for the camera to be rotated about the rear nodal point of the camera. This is known to give the best results (see S. Ray, *Applied Photographic Optics, Lenses and Optical Systems for Photography, film, video and Electronic Imaging*, The Bath Press, Avon, England, 1994, p. 42, and 460–462). However, for images recorded at infinity this restriction can be relaxed. In order to have all these conditions met, there are customized products available to assist the photographer. Included among these is the Interactive Imaging Solutions Kit from Eastman Kodak Company. This kit comes with a camera mount having calibrated click stops every 22.5 degrees and a fitting for a Kodak DC-260 digital camera to assure the rotation axis is at the rear nodal point of the camera. The camera mount is attached to a tripod to assure the images are all parallel to the ground plane.

With the images either scanned or originally captured in digital form, the merging of these images is typically done through a class of algorithms commonly referred to as image stitchers. Examples of such stitchers are QuickTime VR from Apple Computer (also see U.S. Pat. 5,396,583, entitled "Cylindrical to planar image mapping using scanline coherence", issued Mar. 7, 1995 in the name of S. E. Chen and G. S. P. Miller), and PhotoVista from Live Picture. The merged and stitched result is a digital panoramic image.

However, it is desirable to be able to capture panoramic images using a standard, inexpensive consumer camera. One of the difficulties confronting a photographer is that successive images used to build the panoramic image require sufficient overlap for the "stitching" algorithm to work properly. In general, more images with a higher portion of overlap are desirable. However, in order to be efficient and reduce cost to the photographer, a minimum number of shots are desirable. For a hand-held system, the photographer has to remember the orientation of the previous shot and then rotate himself and the camera a number of degrees for the successive shot. Knowing the proper angle can be difficult if not aided by some external device. In general, a minimum of 12 images with a typical field of view is required to get an acceptable result, with 16 images being preferred. In this case, the angular differences between successive images should be as regular as possible.

What is needed is an inexpensive positioning aid for a photographer attempting to create a panoramic image. The aid would provide the photographer with a reference to capture an adequate number of images, each with adequate overlap with neighboring images for an acceptable result.

SUMMARY OF THE INVENTION

The present invention is directed to overcoming one or more of the problems set forth above. Briefly summarized, according to one aspect of the present invention, a panoramic image capture aid is formed in a photographic camera to assist a photographer in recording a series of film images that can be combined to form a panoramic image. The capture aid includes a viewing window on the camera, a first stripe indicator coupled to a film advance mechanism for moving with each film advance, and a second stripe indicator coupled to a compass for indicating the direction the camera is pointing. The first and second stripe indicators are supported in the camera relative to the viewing window such that their stripes intersect in the viewing window when the camera is properly positioned for the next image in the series of images.

By combining a film frame indicator and a compass to establish the positioning information, the invention makes for an inexpensive positioning aid for a photographer attempting to create a panoramic image. The aid provides the photographer a reference to capture an adequate number of images, each with adequate overlap with neighboring images for an acceptable result.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
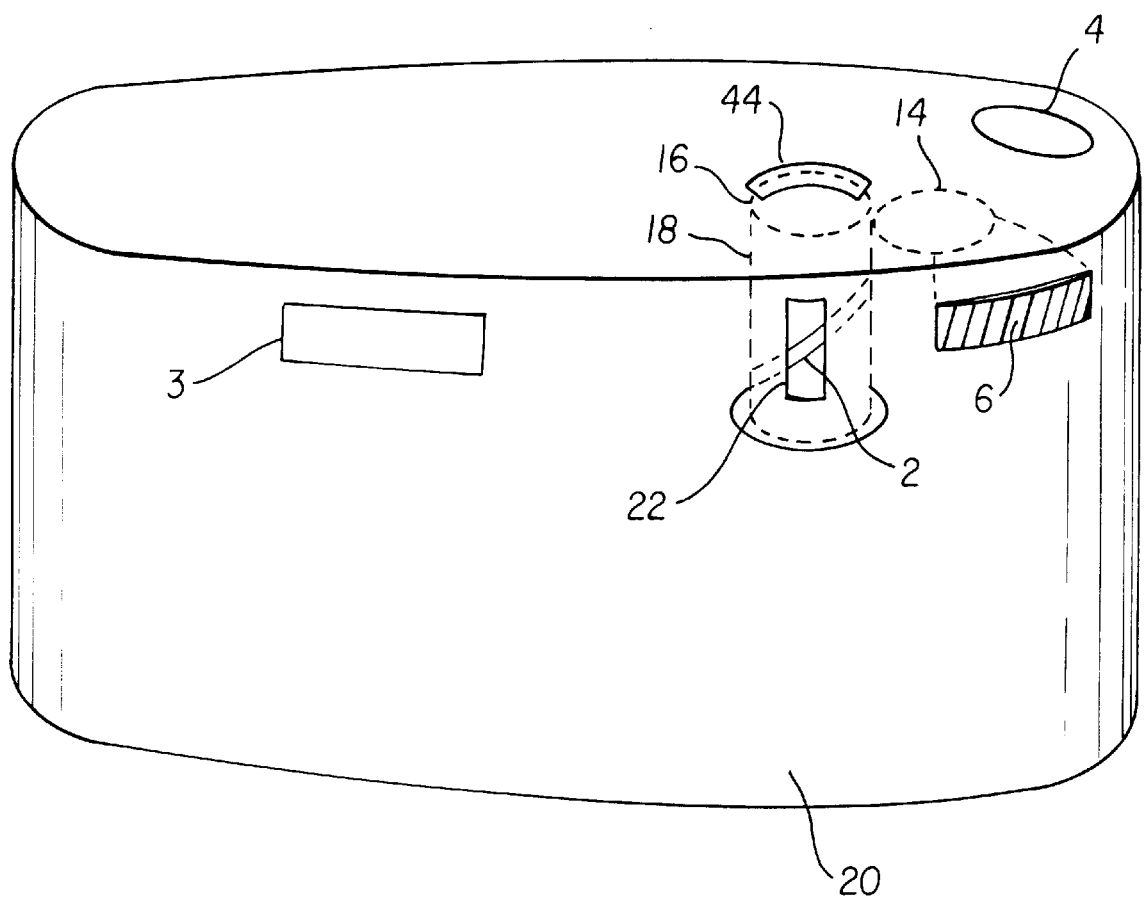
FIG. 1 is a diagram of a camera incorporating a diagonal stripe indicator of the type used in accordance with the invention.

The invention makes use of a couple of known features: a camera indicator for showing the number of images captured and a compass movement for showing camera orientation. Most consumer cameras have a simple means to indicate the number of images recorded. As shown in FIG. 1, one method is by a diagonal stripe 2 that is visible to the photographer through a small plastic viewing window 22 on the back of a camera body 20. The photographer positions the camera by viewing the selected scene through a viewfinder 3 and then operates a shutter release 4, which causes a lens-shutter mechanism (not shown) to expose the scene light upon a photographic film contained within the camera body 20. As a film advance mechanism 6, e.g., a thumb-wheel or similar lever, is operated to advance the film for the next image, a small gear wheel 14 is turned which moves the position of the stripe 2 in the window 22. The position of the stripe 2 relative to the top or bottom of the window 22 gives an approximate indication of the number of images captured, or of the remaining capacity (amount of film) for image capture. The other feature utilized in the invention is a compass, which is a well known inexpensive means that has been used to determine angular orientation in a wide variety of applications. The compass is a passive device, does not require external power and does not have harmful interactions with photographic film.

Figure 2:
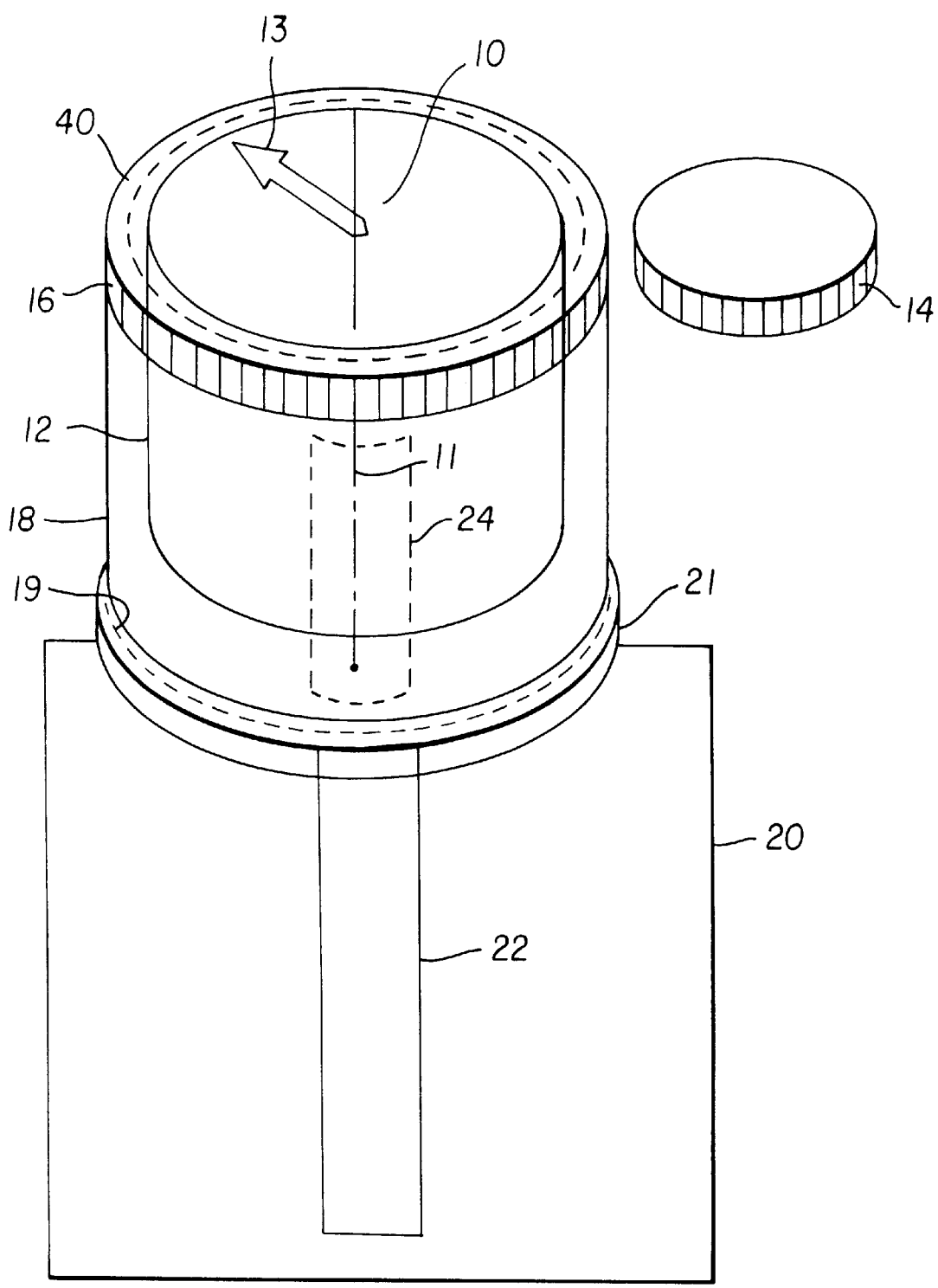
FIG. 2 is a diagram of details of a panoramic image capture aid according to the invention.

Referring now to FIG. 2, the panoramic imaging aid is shown to comprise two concentric bands, the first registering the horizontal angle of the camera and the second registering the current film frame. The first band comprises an inner ring 10 and a first clear plastic ring 12. The inner ring 10 supports a compass needle 13 that is balanced upon an axis 11 to operate as a compass. The first clear plastic ring 12 is attached to the inner ring 10 and the needle 13 and accordingly moves in conjunction with the compass needle 13. The second band comprises an external geared ring 16 and a second clear plastic ring 18. The film advance mechanism 6 (FIG. 1) has attached thereto the geared wheel 14, which is meshed with the external ring 16. Each turn of the film advance mechanism 6 is calibrated to turn the outer geared ring 16 a fixed number of degrees. It is preferable that the angle is 22.5 degrees, through 30 degrees is acceptable. The second clear plastic ring 18 is attached to and supported beneath the geared ring 16 for rotary movement in a groove 19 in a supporting flange 21 that is mounted to the camera body 20. The photographer can observe an area 23 of the two plastic rings 12 and 18 through the view window 22 on the camera body 20.

Figure 3A:
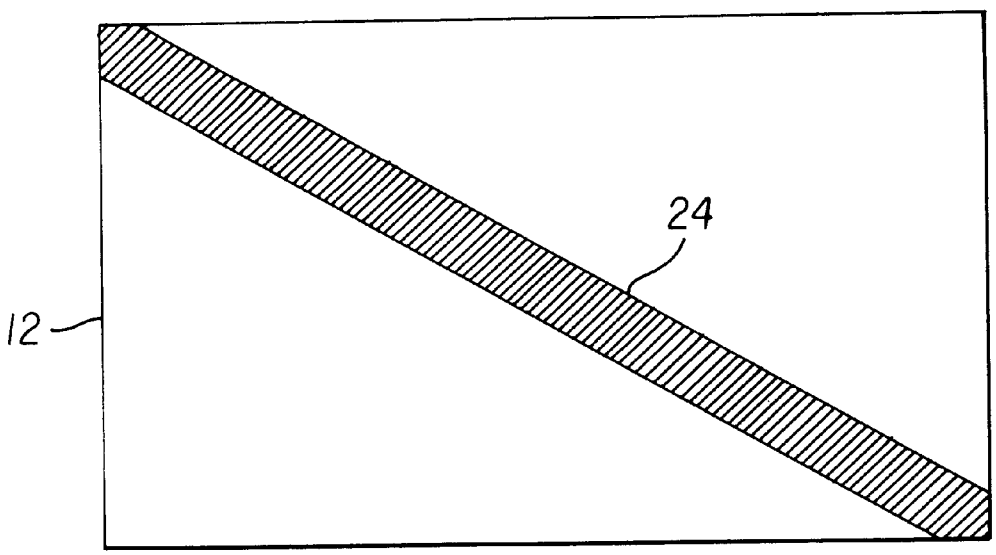
FIGS. 3A and 3B are diagrams of the respective diagonal stripes used in the panoramic image capture aid shown in FIG. 2.
Figure 3B:
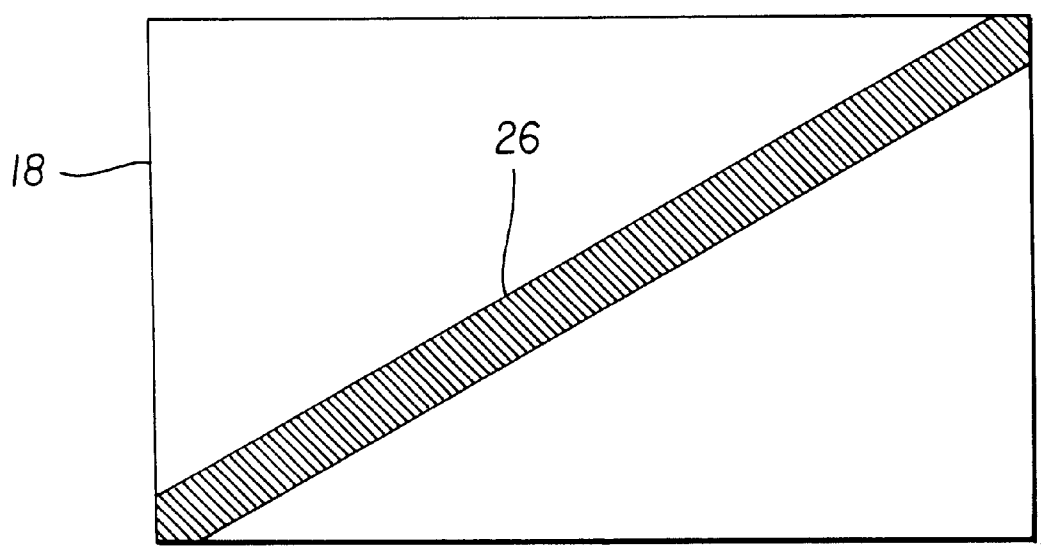
Figure 4A:
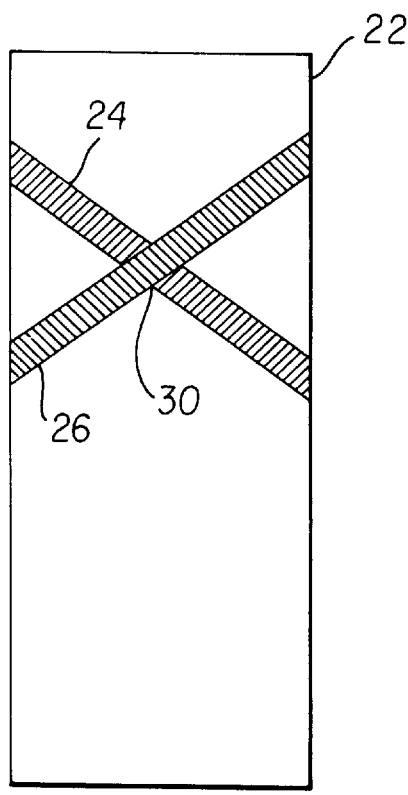
FIGS. 4A and 4B are diagrams showing the position of the diagonal stripes through a viewing window in the panoramic image capture aid shown in FIG. 2.

Referring to FIGS. 3A and 3B, the two plastic rings 12 and 18 are shown as if they were flattened. The inner first ring 12 has a first diagonal stripe 24 and the outer second ring 18 has a second diagonal stripe 26 of the opposite orientation. Referring to FIG. 4A, the photographer looks at the window 22 and turns the camera (and himself) looking for the two diagonal stripes 24 and 26 to cross at their intersection 30. When this occurs the camera is in the proper angular position for the shot. While the mere intersection of the stripes is a sufficient indication in many cases, it is helpful (and preferable) if the first stripe 24 is yellow and the second stripe 26 is cyan such that their intersection will be a red spot (because the combination of the cyan stripe overlying the yellow stripe at the intersection 30 produces red).

Figure 4B:
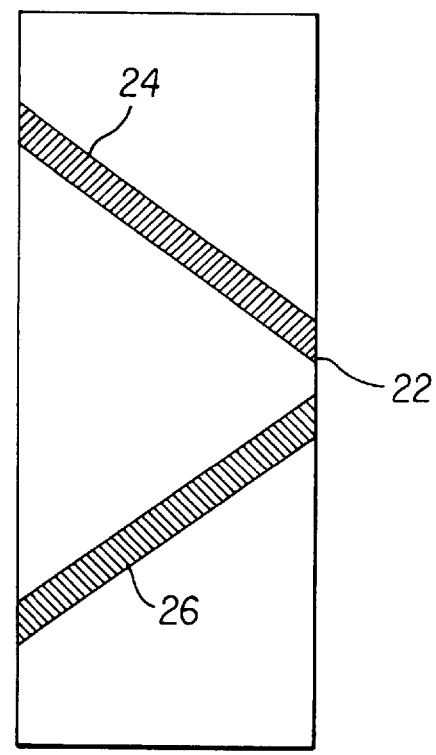

Once the shot is complete, the photographer advances the film, which in turn moves the position of the second diagonal stripe 26 on the outer second ring 18 and the red spot resulting from the crossed diagonal stripes disappears, as shown in FIG. 4B. The photographer again rotates himself and the camera 9. This causes the compass to change the view of the inner first ring 12 and its first diagonal stripe 24 through the view window 22. The photographer continues to rotate until the red dot reappears at the intersection 30 in the viewing window 22. This indicates the proper rotational angle has been achieved for the next image. The subsequent shot to form the panoramic can then be recorded. This procedure is continued as necessary for the requisite number of images.

Figure 5A:
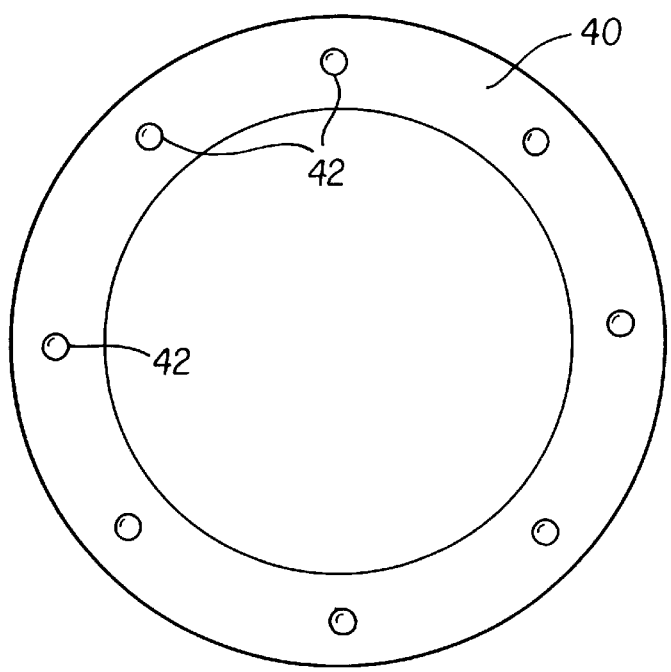
FIGS. 5A and 5B are diagrams showing details pertaining to a further embodiment of the invention.
Figure 5B:
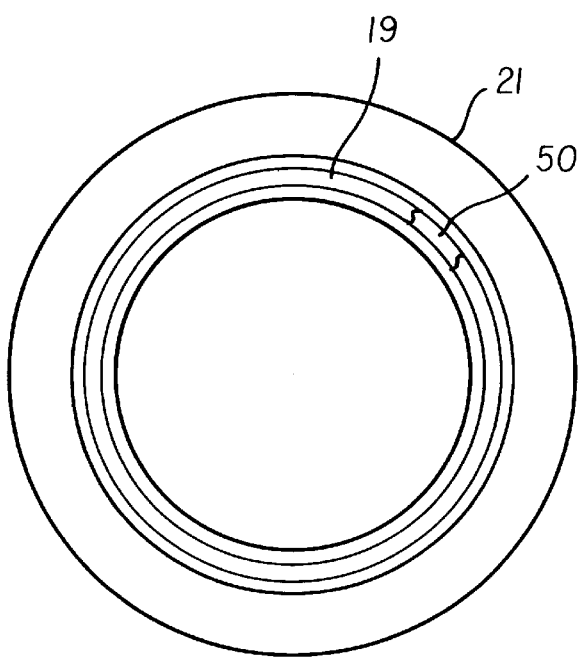

The invention as thus far disclosed does not provide an easy way for the photographer to take advantage of the positioning aid if something less than a full 360 degree panoramic image is desired. For this occasion, the position of the outer ring 18 needs to be initially reset for the position of the first shot in the series of images. This is accomplished by a flange 40 (as shown in broken line in FIG. 2) on the top of the external ring 16 that has, as better shown in FIG. 5A, a series of small depressions 42. As shown in FIG. 1, the top of the camera body 20 has a small slot 44 curved to match the arc of the external ring 16. As shown in FIG. 5B, the groove 19 in the supporting flange 21 includes a spring 50 pressing upwards against the inner ring 18 in order to engage the geared ring 16 with the film advance mechanism 14. A probe, such as a paper clip can be pushed into the slot 44 and, with continued downward pressure, disengage the geared wheel 16 from the geared wheel 14 of the film advance mechanism 6. In use, the photographer thus aligns the camera to the first outermost image to be used to form the panoramic image and then depresses the external ring 16 through the slot 44 and turns the ring 16 until the inner ring 12 and outer ring 18 display a red spot at their intersection 30 in the viewing window 22. The camera is now in readiness for the first image. The outer ring is released and the process proceeds as before.

The invention has been described with reference to a preferred embodiment. However, it will be appreciated that variations and modifications can be effected by a person of ordinary skill in the art without departing from the scope of the invention.

PARTS LIST 2 stripe
3 viewfinder
4 shutter release
6 film advance mechanism
8 gear mechanism
10 inner ring
11 axis
12 first clear plastic ring
13 compass needle
14 geared wheel 14
16 external geared ring
18 second clear plastic ring
19 groove
20 camera body
21 supporting flange
22 viewing window
23 area
24 diagonal stripe
26 diagonal stripe
30 intersection
40 flange
42 depressions
44 slot

What is claimed is:

1. Apparatus for use with a photographic camera to assist a photographer recording a series of film images that can be combined to form a panoramic image, said apparatus comprising:

a viewing window on the camera;
a film advance mechanism;
a first stripe indicator coupled to the film advance mechanism for moving with each film advance;
a compass;
a second stripe indicator coupled to the compass for indicating the direction the camera is pointing; and means for supporting the first and second stripe indicators in the camera relative to the viewing window such that the first and second stripe indicators intersect in the viewing window when the camera is properly positioned for the next image in the series of images.

2. Apparatus as claimed in claim 1 in which the first stripe indicator is formed on a first transparent ring.

3. Apparatus as claimed in claim 2 in which the second stripe indicator is formed on a second ring and arranged concentrically within the first transparent ring such that the intersection of the first and second stripe indicators show through the viewing window.

4. Apparatus as claimed in claim 3 in which the first and second stripe indicators are arrayed in different angular orientations with respect to each other.

5. Apparatus as claimed in claim 1 in which the first stripe indicator is coupled to the film advance mechanism for indicating the number of pictures recorded.

6. Apparatus as claimed in claim 1 in which the position of the first stripe indicator is re-settable with respect to the film drive mechanism.

7. Apparatus as claimed in claim 1 in which the first and second stripes are different colors that intersect at an intersecting portion thereof.

8. Apparatus as claimed in claim 7 in which the different colors are transparent and the intersecting portion thereof forms a third color visible through the viewing window.

9. A method for capturing a series of images that can be combined to form a panoramic image, said method employing a film camera having a first stripe indicator coupled to a film advance mechanism for moving with each advance of the film advance mechanism; a second stripe indicator coupled to a compass for indicating the direction the camera is pointing; and means for supporting the first and second stripe indicators relative to the camera body such that the first and second stripe indicators intersect in a viewing window when the camera is properly positioned for each image in the series of two or more images that are being captured to form the panoramic image, said method comprising the steps of;

(a) positioning the camera such that the first and second stripe indicators intersect in the viewing window;

(b) capturing the first image in the series of images;

(c) advancing the film advance mechanism such that the first stripe indicator moves to a new location in the viewing window;

(d) re-positioning the camera such that the second indicator is moved until the first and second stripe indicators again intersect in the viewing window; and (e) capturing the second image in the series of images.

10. A method as claimed in claim 9 further comprising the steps of:

(f) further advancing the film advance mechanism such that the first stripe indicator moves to a further new location in the viewing window;

(g) further re-positioning the camera such that the second indicator is moved until the first and second stripe indicators again intersect in the viewing window;

(h) capturing the third image in the series of images; and (i) repeating steps (f) through (h) until the desired number of images are captured.

11. A method as claimed in claim 9 wherein step (a) comprises resetting the position of the first stripe indicator before positioning the camera such that the first and second stripe indicators intersect in the viewing window.

* * * * *